(12) United States Patent
Kalinoski et al.

(10) Patent No.: US 7,328,406 B2
(45) Date of Patent: Feb. 5, 2008

(54) SYSTEM, METHOD AND SOFTWARE FOR MANAGING AND PUBLISHING RESOURCE AVAILABILITY DATA

(75) Inventors: Ken Kalinoski, Austin, TX (US); Kirk Norsworthy, Austin, TX (US); James Stephens, Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 666 days.

(21) Appl. No.: 10/836,688

(22) Filed: Apr. 30, 2004

(65) Prior Publication Data

US 2005/0246666 A1 Nov. 3, 2005

(51) Int. Cl.
*G06F 17/00* (2006.01)

(52) U.S. Cl. ............... 715/738; 715/741; 715/743; 705/8; 705/26; 718/104; 718/100; 709/226; 709/223

(58) Field of Classification Search ........ 715/734–744; 709/223–226; 705/8, 26; 707/3, 103; 718/104, 718/100; 719/318
See application file for complete search history.

(56) References Cited

U.S. PATENT DOCUMENTS

| | | | |
|---|---|---|---|
| 6,298,352 B1 * | 10/2001 | Kannan et al. | 707/102 |
| 6,621,793 B2 * | 9/2003 | Widegren et al. | 707/102 |
| 7,069,097 B1 * | 6/2006 | Barto et al. | 700/100 |
| 7,076,552 B2 * | 7/2006 | Mandato | 709/226 |
| 7,111,297 B1 * | 9/2006 | Sankaranarayan et al. | 718/104 |
| 2001/0027481 A1 * | 10/2001 | Whyel | 709/218 |
| 2002/0016729 A1 * | 2/2002 | Breitenbach et al. | 705/9 |
| 2002/0072938 A1 * | 6/2002 | Black et al. | 705/5 |
| 2002/0146012 A1 * | 10/2002 | Coutuier | 370/395.2 |
| 2003/0004762 A1 * | 1/2003 | Banerjee et al. | 705/5 |
| 2003/0028656 A1 * | 2/2003 | Babka | 709/229 |
| 2003/0061087 A1 * | 3/2003 | Srimuang et al. | 705/8 |
| 2003/0154112 A1 * | 8/2003 | Neiman et al. | 705/5 |
| 2004/0054931 A1 * | 3/2004 | Himmel et al. | 713/202 |
| 2004/0111307 A1 * | 6/2004 | Demsky et al. | 705/8 |
| 2005/0091654 A1 * | 4/2005 | Lection et al. | 718/100 |
| 2005/0193023 A1 * | 9/2005 | Ismail | 707/200 |
| 2005/0197877 A1 * | 9/2005 | Kalinoski | 705/8 |

* cited by examiner

*Primary Examiner*—Tadesse Hailu
(74) *Attorney, Agent, or Firm*—Oblon, Spivak, McClelland, Maier & Neustadt, P.C.

(57) ABSTRACT

A system, method and software permitting the publication of resource availability information and the management of reservation requests therefor are provided. In an exemplary embodiment, a resource provider provides authorization, availability, descriptive, linking and criteria information for a resource available for reservation presented on a publicly accessible web site. Users permitted to access to the data can browse and search the published resource related data and request appointments with or reservations of the listed resources. Resource providers are permitted to actively or automatically manage reservations and appointments requesting their resources. Available on a publicly accessible web site, resource providers may also control and define access limitations for various groups of viewers.

20 Claims, 6 Drawing Sheets

SYSTEM, METHOD AND SOFTWARE FOR MANAGING AND PUBLISHING RESOURCE AVAILABILITY DATA

TECHNICAL FIELD OF THE INVENTION

The present invention relates generally to data sharing and, more particularly, to facilitating data flow to enhance the efficiency with which resources are managed and shared.

BACKGROUND OF THE INVENTION

Anyone who has attempted to arrange a meeting with a busy client or friend is familiar with the concept of phone tag. In phone tag, you try to reach your client or friend to set up a meeting but are forced to leave a message because the party you seek is either not around or on another line. Email doesn't often produce better results because your email messages may be received by an unmanned terminal or, while you wait on a response from an invitee, you are forced to cancel the very meeting you sought to set up due to a conflict only to receive an acceptance from your invitee shortly thereafter. These are difficulties typically associated with setting up a two party meeting. It is easy to see that such difficulties can grow exponentially when you have a multi-party meeting or seek to use resources simultaneously available to numerous others.

In an attempt to reduce these and other difficulties, a variety of calendaring and notification applications and utilities exist. However, along with the capabilities included in each are a number of limitations. For example, many web portals offer registered users the ability to maintain a calendar for their personal use. While such calendars are accessible from substantially any point where a user can access a web browser and the Internet, such calendars are limited in at least the aspect that they typically may be viewed only by the party to whom they belong, i.e., the registered user, and they make little to no provision for configuring one more levels of access control.

Likewise, programs such as Microsoft Outlook® and Lotus Notes® offer a variety of calendar specific capabilities as well as a number of associated functions, such as the ability to organize meetings, including managing invitee lists. However, like their web portal counterpart, such applications are also burdened by limitations. For example, Microsoft Outlook® permits users to share their calendar with delegates so long as the delegates are within the same organization as the calendar owner. Various other capabilities of Microsoft Outlook® are similarly limited in that they have usefulness solely within the organization in which the capabilities are based and little to no applicability outside the organization.

SUMMARY OF THE INVENTION

In accordance with teachings of the present disclosure, software for providing resource availability and reservation content is provided. In a preferred embodiment, the software is embodied in computer readable media. When executed, the software is preferably operable to identify an access level associated with a requestor seeking to access resource availability and reservation content maintained by a resource availability and reservation management system. The software is preferably further operable to extract availability content from one or more resource availability and reservation management system data storage areas based on a requester resource selection and the requester access level.

In addition, the software is preferably operable to present to the requester the extracted availability content along with one or more options enabling the requester to request reservation of an available resource.

Also in accordance with teachings of the present invention, a resource availability and reservation content management system is provided. In a preferred embodiment, the system includes at least one processor, memory operably associated with the at least one processor and at least one data storage device operably associated with the memory and the at least one processor. The system preferably also includes at least one communication interface operable to enable communications between the resource availability and reservation content management system and one or more user communication devices. At least one program of instructions storable in the memory and executable in the processor is also preferably included. The program of instructions is preferably operable to accept information defining a resource to be made available for reservation, maintain access to at least a portion of the information defining the resource to be made available for reservation through a content site accessible by a plurality of authorized users, and enable authorized user generation of reservation requests for one or more resources presented on the content site.

A method for providing a resource availability and reservation management to a plurality of users via a publicly accessible resource availability and reservation content site is also provided in accordance with teachings of the present invention. The method preferably includes defining a plurality of resources available for reservation and creating a reservation availability schedule for each resource available for reservation. The method preferably further includes generating a reservation request for a resource available for reservation in response to user selection of the resource and processing the reservation request in accordance with one or more resource provider reservation request preferences.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 6, wherein like numbers are used to indicate like and corresponding parts.

In general, the present invention concerns the ability to allow a resource provider to publish resource availability schedules to potential users of such resources. In addition, the potential users or resource requesters are preferably able to review the resource availability information and submit requests for use of a resource maintained by a resource provider. In an effort to enhance the efficacy of teachings of the present invention, the resource availability information and the capability to peruse and interact with such information is preferably facilitated on a publicly accessible content site, such as an Internet based web page.

As used herein, and dependent on the mode in which a visitor operates when visiting a publicly accessible resource availability and reservation system incorporating teachings of the present invention, the visitor may be considered a resource provider or a resource requester. In one aspect, a resource provider may be defined as one who maintains one or more resources for reservation through the associated resource availability and reservation system. In another aspect, a resource requester may be any user, whether registered, unregistered, a resource provider under other circumstances, or otherwise characterized, where the user seeks to leverage the capabilities and functionalities of an associated resource availability and reservation system in pursuit of making one or more requests for reservation of a resource. It should be noted that other means for determining or defining the role of a user may be implemented within the teachings of the present invention.

A resource, according to teachings of the present invention, may be virtually anything one entity may make available for use by another entity. As such, a resource maintained for reservation in accordance with teachings of the present invention may include, without limitation, services from a service provider, hardware from a hardware provider, a pool of services and/or hardware, as well as individuals or a pool of individuals. Alternative definitions and exemplars of resources maintained for reservation may be used in accordance with the teachings discussed herein.

Figure 1:
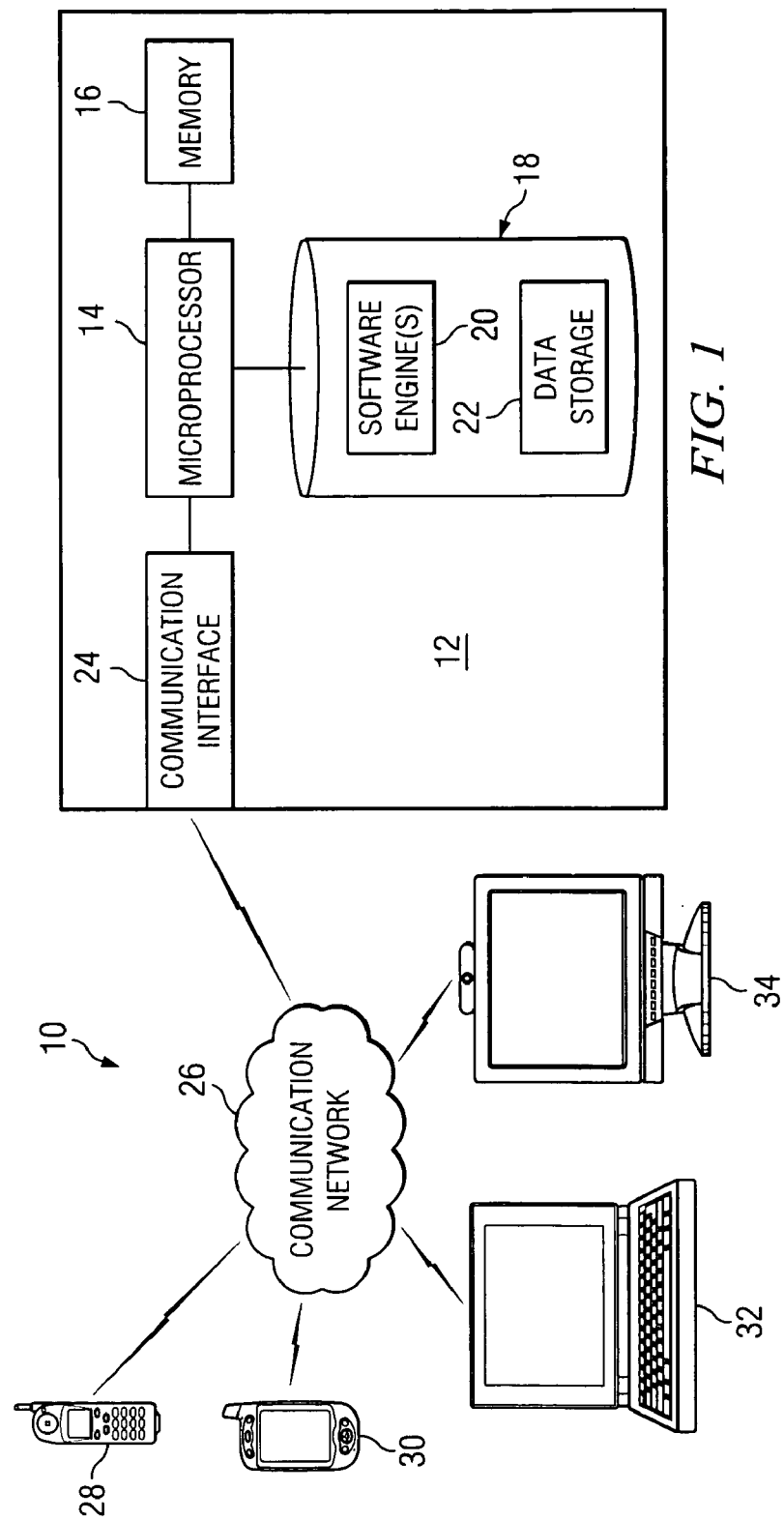
FIG. 1 is a schematic diagram depicting an exemplary embodiment of resource availability and reservation system according to teachings of the present invention.

Referring first to FIG. 1, an exemplary embodiment of a resource availability and reservation system incorporating teachings of the present invention is shown. It should be noted that the exemplary embodiment of system 10 illustrated in FIG. 1 may be varied in one or more aspects without departing from the spirit and scope of the teachings disclosed herein.

In the exemplary embodiment illustrated in FIG. 1, system 10 preferably includes computer or information handling system 12. In general, computer or information handling system 12 preferably includes one or more microprocessors 14. One or memory devices 16 are preferably also included in computer or information handling system 12 and operably coupled to microprocessor 14. In general operation, microprocessor 14 and memory 16 preferably cooperate to execute and store, respectively, one or more instructions of a program of instructions as well as perform other operations.

Computer or information handling system 12, as illustrated in the exemplary embodiment of FIG. 1, preferably also includes one or more storage devices 18 operably coupled to microprocessor 14. In accordance with teachings of the present invention, storage device 18 preferably includes one or more software engines 20 operable to enable the maintenance, management, publication, presentation, provision and/or other data manipulation capability of resource availability and reservation information as well as perform other operations. Depending upon implementation, various aspects of teachings of the present invention may be implemented in a single software engine 20, in a plurality of software engines 20, in one or more hardwired components or in a combination of hardwired and software systems.

In addition to one or more software engines 20, storage device 18 preferably also includes one or more data storage areas 22. Data storage area 22 of storage device 18 may be leveraged to maintain data concerning the availability of one or more resources maintained for reservation, descriptive information concerning the one or more resources maintained for reservation, as well as other information pertinent to the management, maintenance, publication, presentation and/or provision of resource availability and reservation information. Data storage area 22, or portions thereof, may also be utilized to store myriad other data.

Depending upon implementation, data storage device 18 may be implemented within computer or information handling system 12, in a storage area network operably coupled to computer or information handling system 12, and/or in other storage media, including removable media, compatible with and accessible by computer or information handling system 12. In an exemplary embodiment, the one or more software engines 20 and data storage areas 22 preferably cooperate in the maintenance, management, publication, presentation, provision and/or other manipulation of resource availability and reservation information, according to teachings of the present invention.

Computer or information handling system 12 preferably also includes one or more communication interfaces 24 in an exemplary embodiment. Preferably, communication interface 24 is operable to communicatively couple computer or information handling system 12 with one or more communication networks 26. Communication network 26 may be a personal area network, local area network, metropolitan area network, wide area network, an alternate network configuration or some combination of network types and/or topologies.

Communication interface 24 may be operable to enable communications with a plurality of user communication devices via communication network 26. User communication devices which may be leveraged in accordance with teachings of the present invention include, without limitation, mobile telephone 28, personal digital assistant 30, computer system 32, video display/conferencing system 34, as well as other communication-enabled devices.

Communication network 26 may include one or more gateway devices (not expressly shown) in an exemplary embodiment. User communication devices 28, 30, 32 and 34 may each be operable to communicate with the gateway devices of communication network 26 just as computer or information handling system 12 is preferably operable to communicate with the gateway devices. In this manner, user communication devices 28, 30, 32 and 34 may be in selective communication with computer information handling system 12 via the gateway devices and communication network 26.

The gateways of communication network 26 preferably provide user communication devices 28, 30, 32 and 34 and computer or information handling system 12 with an entrance to communication network 26 and may include software and hardware components to manage traffic entering and exiting communication network 26 and conversion between the communication protocols used by user communication devices 28, 30, 32 and 34, computer or information handling system 12 and communication network 26. In certain embodiments, the gateways of communication network 26 may function as a proxy server and a firewall server for user communication devices 28, 30, 32 and 34 as well as computer or information handling system 12. Further, the gateways may be associated with a router (not expressly shown) operable to direct a given packet of data that arrives at a gateway and a switch (not expressly shown) operable to provide a communication path into and out of each gateway.

In one embodiment, communication network 26 may be a public switched telephone network (PSTN). In alternate embodiments, communication network 26 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present invention.

In an exemplary embodiment, user communication devices 28, 30, 32 and 34 may include a variety of forms of equipment connected to communication network 26 and accessible to a user. User communication devices 28, 30, 32 and 34 may be, employ or include telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. User communication devices 28, 30, 32 and 34 may be equipped for connectivity to communication network 26 via a PSTN, DSLs, cable network, wireless network, or other communication channel.

Figure 2:
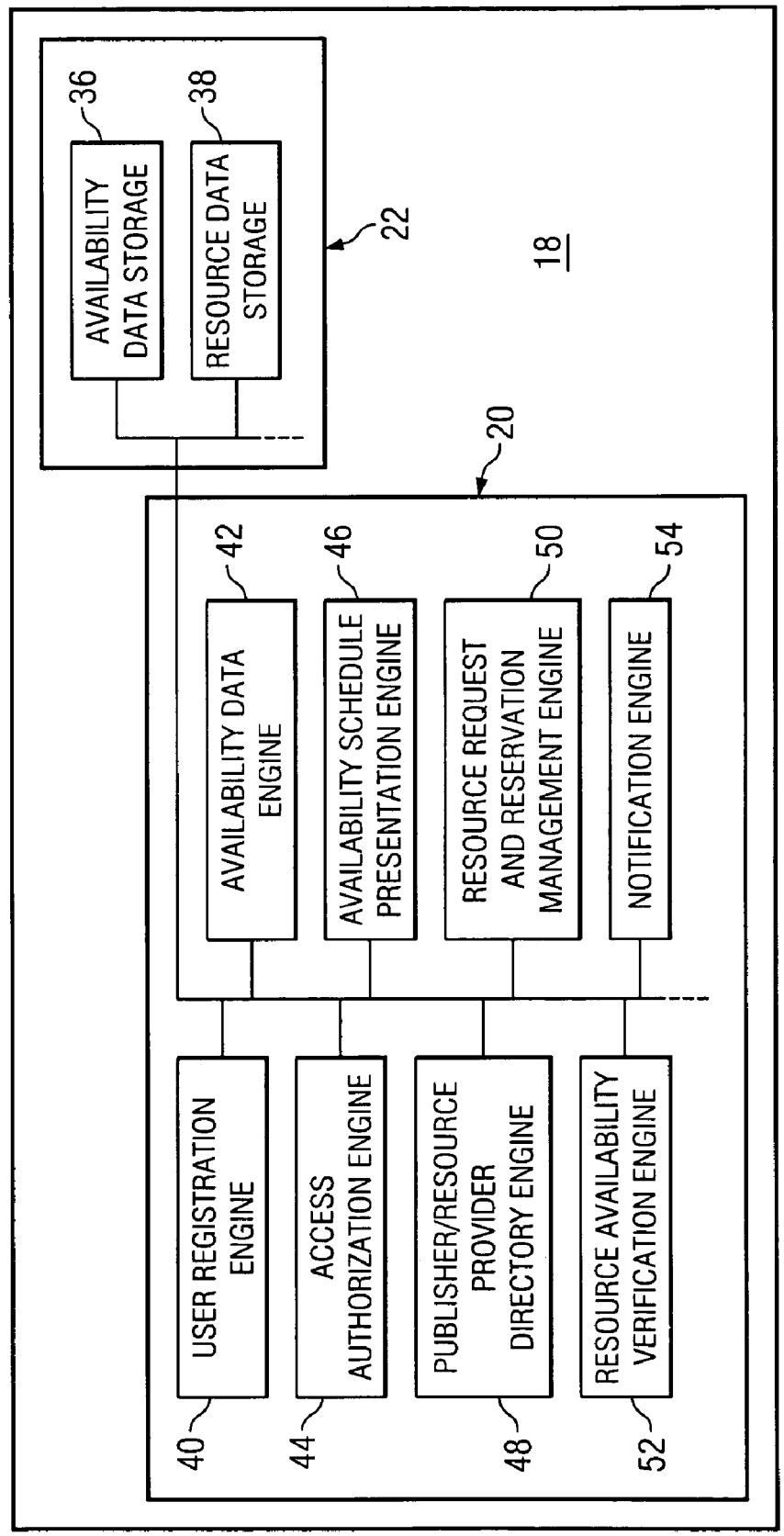
FIG. 2 is a schematic diagram depicting an exemplary embodiment of a plurality of software engines and data storage areas for use in a resource availability and reservation system according to teachings of the present invention.

Referring now to FIG. 2, one embodiment of a collection of software engines 20 and data storage areas 22 is shown according to teachings of the present invention. As mentioned above, the number of software engines 20 and data storage areas 22 may be varied and, as such, the specific arrangement discussed herein is presented primarily for descriptive purposes.

As illustrated in FIG. 2, data storage area 22 of data storage device 18 may include one or more resource availability data storage areas 36. According to teachings of the present invention, resource availability data storage area 36 may include data pertaining to times, dates or other information concerning when a resource may be reserved. In addition, resource availability data storage area 36 may also include various settings and specific data associated with a registered resource's availability. In an exemplary embodiment, resource availability data storage area 36, according to teachings of the present invention, may cooperate with other data maintained in one or more data storage areas 22 as well as one or more software engines 20.

In the exemplary embodiment illustrated in FIG. 2, data storage area 22 preferably also includes one or more resource data storage areas 38. Resource data storage area 38 is preferably operable to maintain data concerning one or more aspects of information regarding a resource maintained for reservation. For example, images, descriptive information, as well as other information regarding a resource maintained for reservation may be stored in resource data storage area 38. Further, resource data storage area 38 may also include billing requirements, costs and other charges associated with use of a resource maintained for reservation. Still further, resource data storage area 38 may include information defining relationships between resources, such as relationship details requiring two or more linked resources to be concurrently reserved for effective operation of a requested resource reservation. Additional information may be maintained in resource data storage area 38 without departing with the spirit and scope of teachings of the present disclosure.

Teachings of the present invention may be implemented or effected using a variety of components and/or techniques. In an exemplary embodiment of the present invention, one or more software engines 20 may be leveraged in the maintenance, management, publication, presentation and/or provision of a resource availability and reservation system. As such, according to teachings of the present invention, one or more software engines 20 preferably associated with computer or information handling system 12 cooperate to achieve and effect teachings discussed herein.

As illustrated in FIG. 2, an exemplary embodiment of the present invention may include user registration engine 40. According to teachings of the present invention, user registration engine 40 may require or request a variety of data from a user during a registration process, in some instances regardless whether the user intends to act as a resource requester, resource provider, both a resource requester and a resource provider or otherwise.

In addition to performing such conventional user registration tasks as requiring or requesting a user to create a user name and/or password, an exemplary embodiment of user registration engine 40 employed by computer or information handling system 12 preferably requires or requests a registering resource provider to submit availability data as to one or more resources the resource provider desires to maintain for reservation. In addition, user registration engine 40 may also request or require that a resource provider submit information describing the one or more resources to be maintained for reservation. Further, user registration engine 40 may request or require that a resource provider set desired access rights for resource requesters seeking to view the resources maintained for reservation by the resource provider.

For example, a resource provider seeking to make one or more resources available for reservation may define one or more groups of viewers or resource requesters to which the resource provider wishes to grant access and the ability to make reservation requests. Further, a resource provider may also be requested to define the groups of viewers or resource requesters that can search resources, create, modify and delete requests and reservations, as well as perform other operations with special permissions during the registration process. Further, a resource provider may be requested to define availability and reservation content presentations for each of a varied array of access levels granted to viewers or resource requesters during a registration process.

Exemplary user registration engine 40 may also request or require a resource provider to define desired links between two or more available resources. For example, if a resource provider wishes to make available selected pieces of video conferencing hardware, the resource provider may link reservation of the selected pieces of video conferencing hardware to concurrent reservation of adequate communications channel bandwidth to support the anticipated videoconference. Other embodiments of linking two or more resources are contemplated within the teachings of the present invention.

An exemplary embodiment of user registration engine 40 may also require or request entry of one or more resource reservation criteria. In addition, reservation criteria may be established on an individual resource requestor basis. For example, resource requesters in a certain group or resource requestors with an account or credit card number on file may be permitted access to information different from those not so categorized. Further, reservation criteria may include reservation request constraints, for example, permitting approval of reservation requests for less than four (4) hours of a requested resource's available time. Criteria settings may also be used in the automatic disposition of reservation requests received by a resource provider. Additional reservation criteria may be required or requested by exemplary user registration engine 40, according to teachings of the present invention.

Exemplary user registration engine 40 may also require or request a registering user to set one or more viewer presentation preferences. In one aspect, for a resource provider, the setting of viewer presentation preferences may include defining which resource requesters have access to what level of information regarding resources maintained for reservation by the resource provider. In an alternate aspect, setting resource requestor presentation preferences may include defining images, descriptive information as well as other aspects of a visual layout to be presented to a resource requestor.

Various other data may be gathered from a registering user by a user registration engine incorporating teachings of the present invention. For example, user registration may permit a resource requestor or resource provider to identify one or more delegates that may act on their behalf. In addition, user registration engine may ask a resource provider to select a reservation request processing preference, such as automated or manual. It should be noted that user registration engine 40 may leverage one or more additional software engine 20 in the performance of the exemplary operations discussed above and that in operations discussed, with respect to certain circumstances user registration engine 40 may be supplanted by alternative software engine 20 functionality.

In addition to user registration engine 40, an exemplary embodiment of a system, method and software incorporating teachings of the present invention may also include availability data engine 42. Preferably, availability data engine 42 facilitates entry of availability data to be associated with a resource available for registration. In one embodiment, availability data engine 42 may be a prompt driven system enabling manual entry of availability data to be associated with one or more resources to be maintained for reservation.

In a further embodiment, an exemplary availability data engine 42 incorporating teachings of the present invention may permit a user to upload and/or download one or more aspects of availability data associated with a resource to be maintained for reservation. For example, a user may upload or download information concerning one or more resources from or to one or more applications maintained by the user on a local computer, personal digital assistant, or other information handling system as well from a user maintained network site such as a web-based calendaring application or some other content site. Examples of applications or utilities from which information may be uploaded or to which information may be downloaded includes, without limitations, Microsoft Outlook®, Yahoo! Calendar®, Lotus Notes®, as well as other calendaring applications.

As suggested above, availability data engine 42 may be leveraged in association with user registration engine 40 as well as other software engines 20, in the creation of an availability schedule for one or more resources to be maintained for reservation. Further, an availability data engine incorporating teachings of the present invention, specifically a synchronization function, may enable registered users to maintain coherency between a portable or local calendaring utility or application and a publicly accessible resource availability and reservation system incorporating teachings of the present invention. Synchronization capabilities may also include functionality operable to resolve conflicts between a user's calendaring utility and availability scheduling maintained by the resource availability and reservation system.

In an exemplary embodiment, access authorization engine 44 is preferably included among software engines 20 in data storage 18 of computer or information handling system 12. In general, resource providers maintaining resources for reservation may specify what users or groups of users can search calendars and create, modify and delete requests and/or reservations using one or more aspects of access authorization engine 44. Preferably, access authorization engine 44 enables users from a variety of organizations and sources to utilize the resource availability and reservation content management teachings of the present invention. Access authorization engine 44 preferably supports fine grain access control to substantially no authorization access.

In one aspect, access authorization engine 44 may be leveraged to control entry or access to a publicly accessible site providing authorized users with availability and reservation associated content regarding resources maintained for reservation. As described above, access authorization engine 44 may also be utilized to control the details of reservations, resources, as well as other information provided to users accessing such data based upon an authorization level associated with each specific user. For example, a resource provider maintaining for reservation one or more resources may permit any user accessing the resource availability and reservation site to see any or all availability and reservation information on a selected availability calendar. In contrast, separate settings may be defined by the resource provider such that only availability information is available to registered users and no other information is exposed, e.g., reservation information. Access authorization engine 44, according to teachings of the present invention, may also enable a resource provider to delegate access granting or other authorities to other users.

In an exemplary embodiment of teachings of the present invention, availability schedule presentation engine 46 is preferably included. In general, availability schedule presentation engine 46 may be leveraged in association with one or more included software engines 20 and data available in data storage area 22 to enable visual layout and presentation structure of a resource availability and reservation content page. For example, availability schedule presentation engine 46 may enable general content site presentation of one or more resources maintained for reservation, the annotation of the resources maintained for reservation, one or more search features or viewer customization presentation features, user communication device formatting, as well as other aspects of delivering resource availability and reservation information to a viewer or registered user via a content site.

Availability schedule presentation engine 46 may also be utilized, in association with access authorization engine 44 for example, upon discerning whether a user is a resource provider or resource requester seeking information, to define the view presented to the identified user type. For example, resource requesters, whether non-resource providers or resource providers acting as resource requesters, may be presented with limited information and fewer, if any, tools to modify, create, delete or otherwise manipulate information provided via a resource availability and reservation system incorporating teachings of the present invention. FIG. 3 through FIG. 6, discussed below, include exemplary embodiments of content pages whose presentation and layout may be effected using one or more content presentation engines such as availability schedule presentation engine 46.

Publisher or resource provider directory engine 48 may also be provided among software engines 20 of computer or information handling system 12 in an exemplary embodiment. In one aspect, publisher or resource provider directory engine 48 may enable visitors, whether registered, unregistered or otherwise, to view and/or search resources maintained for reservation via a resource availability and reservation site, and/or to view the publishers or resource providers participating in the provision of resources for reservation through such site.

In an alternate embodiment, publisher or resource provider directory engine 48 may have broader applicability in that it may permit searching substantially all aspects of information associated with a resource availability and reservation system incorporating teachings of the present invention to the extent such information is not designated privileged, confidential or otherwise protected. For example, a resource requestor may leverage publisher or resource provider directory engine 48 to search for plumbers available April 30 between the hours of 10:00 and 12:00 to search for video editing services offered by XYZ editing, as well as other search formats.

In an exemplary embodiment, resource request and reservation management engine 50 may also be provided according to teachings of the present invention. In one aspect, resource request and reservation management engine 50 may be employed to monitor and ensure compliance with reservation criteria established by the providers of the resources available for reservation. Further, resource request and reservation management engine 50 may also be employed to monitor and ensure compliance with one or more reservation linking requirements requested by a provider of one or more resources available for reservation. In addition, resource request and reservation management engine 50 may, such as through cooperation with notification engine 54, be operable to notify a resource provider of a resource reservation request, to notify a resource requester as to the status of a reservation request for a selected resource, generate one or more meeting requests or reminders indicative of the resource reservation, as well as perform other tasks.

Resource availability verification engine 52 may also be included in an exemplary embodiment of the present invention. In one aspect, resource availability verification engine 52 may be used to perform one or more checks on resources maintained for reservation to ensure that postings regarding such resources accurately reflect substantially current or up-to-date availability. In another aspect, resource availability verification engine 52 may, upon receipt of a resource reservation request, verify that a selected resource remains available and has not been reserved in the interim period between a posting of the selected resource's reservation availability and the time when a user makes or initiates a reservation request process. Other operations and benefits may flow from a resource availability verification engine incorporating teachings of the present invention.

In addition to or in lieu of one or more software engines 20 discussed above, notification engine 54 may also be included in an exemplary embodiment of the present invention. As mentioned above, one or more notifications may be generated to a resource provider in response to a reservation request from a resource requestor for the provider's resource. Notification engine 54, according to teachings of the present invention, may also be employed to notify a resource requester as to the status of submitted reservation requests and/or acknowledged reservations, such as informing the resource requester as to the denial, acceptance or pendency of a resource reservation request.

Notification engine 54 may also be leveraged to inform personnel associated with a resource maintained for reservation of an upcoming assignment. For example, a facilities management group may be notified regarding an upcoming videoconference reservation such that the facilities management group may arrange an associated conference room, videoconferencing hardware, communications channel and other details in preparation for the reservation. It may be appreciated that other situations exist in which a notification would be preferred or required. As such, a variety of other notifications may be performed by notification engine 54 included in an exemplary embodiment of the present invention without departing from the spirit and scope of the teachings discussed herein.

A number of software engines 20 are discussed in reference to FIG. 2. Such discussion is exemplary and not intended to be an exhaustive listing of potentially useful capabilities. One or more of the software engines discussed above may be combined or divided and additional software engines 20 may be included in an implementation of the present invention. Further, the discussion of FIG. 3 through FIG. 6 may suggest as a variety of additional software engines 20 contemplated by the present invention.

Figure 3:
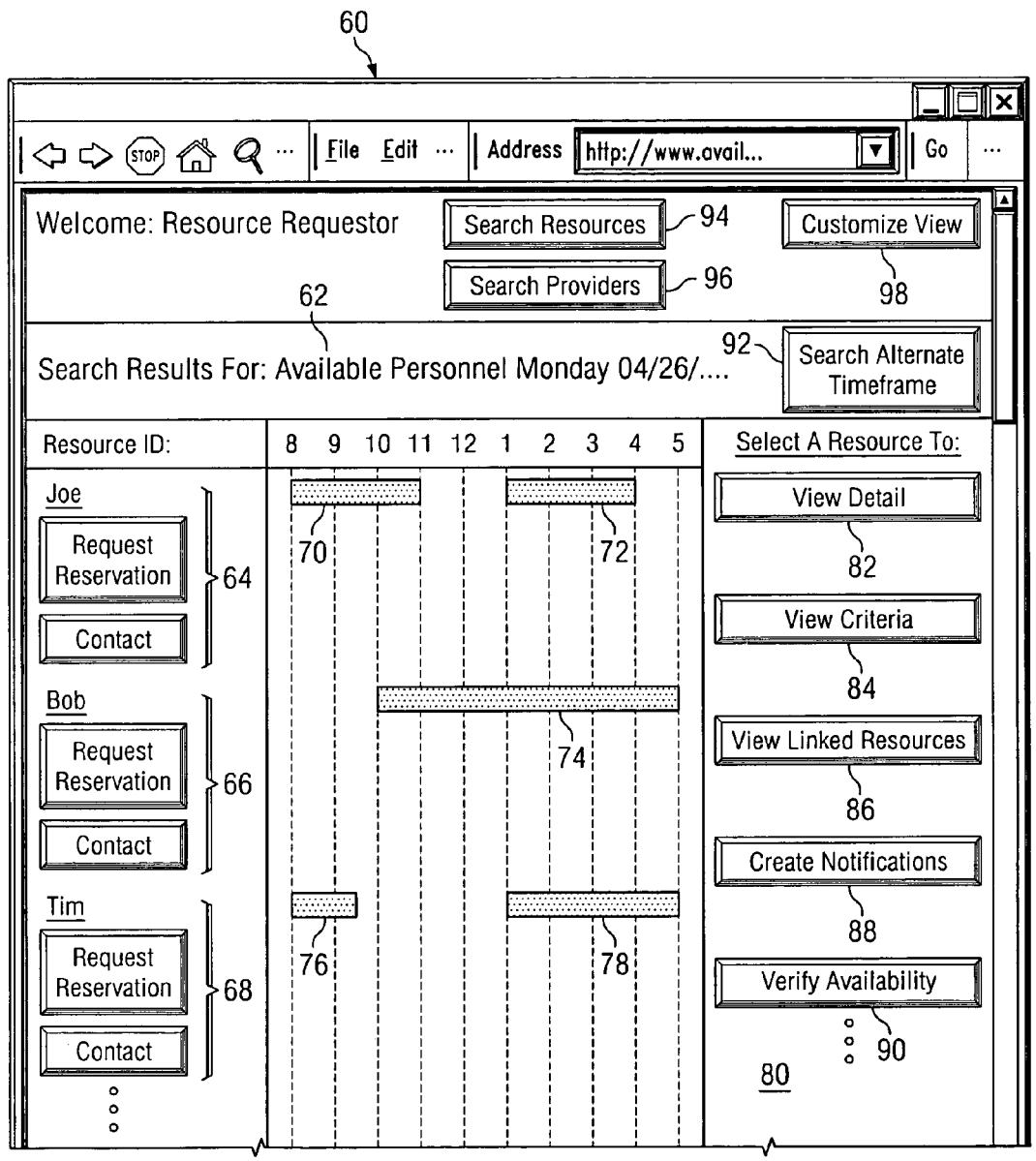
FIG. 3 is a schematic diagram depicting an exemplary embodiment of a resource availability and reservation system resource search content page according to teachings of the present invention.

Referring now to FIG. 3, a schematic diagram depicting an exemplary embodiment of a resource availability and reservation system resource search content page incorporating to teachings of the present invention is shown. It should be noted that exemplary resource search content page 60 may be modified without departing from the teachings of the present invention.

An exemplary embodiment of a resource availability and reservation system research search content page, as illustrated at 60 in FIG. 3, may include resource availability detail 62. As illustrated in FIG. 3, resource availability detail 62 reflects a reservation availability for resources 64, 66, and 68. Preferably associated with the identification of resources 64, 66 and 68 are respective reservation availabilities indicated by bars 70, 72, 74, 76 and 78. For example, resource 64, depending upon implementation, is indicated in resource availability detail 62 as being available during the hours of 8:00-11:00 at bar 70 as well as during the hours of 1:00-4:00 at bar 72. Resource 66, as indicated by availability bar 74, is shown as available from the hours of 10:00-5:00. Likewise, resource 68 is shown at bar 76 to be available from the hours of 8:00-9:30 and at bar 78 to be available during the hours of 1:00-5:00. As suggested above, the specific implementation of resource detail 62 may be varied, preferably, so long as the resource detail implementation shown includes the information desired by a resource requester, e.g., the availability and/or unavailability of one or more identified resources.

According to an exemplary embodiment of the present invention, myriad information may be available concerning one or more resources maintained for reservation by a resource availability and reservation system incorporating teachings of the present invention. As illustrated in resource availability and reservation system resource search content page 60, a number of options for obtaining or accessing additional information regarding one and more resources maintained for reservation are indicated at options list 80 of resource availability detail 62. Selection of one or more of the options available at options list 80, in an exemplary embodiment, may leverage capabilities and information preferably included in one or more software engines 20 and data storage area 22, respectively, included on computer or information handling system 12.

For example, user selection of "view detail" option 82 may present to a resource requester one or more additional aspects regarding one or more selected resources maintained for reservation. Further, selection of view detail option 82 in an exemplary embodiment may leverage one or more aspects of access authorization engine 44, availability data engine 42, and/or one or more other software engines 20 as well as one or more aspects of availability data storage 36, resource data storage 38 and/or other data. View detail option 82 may be utilized in accordance with teachings of the present invention to communicate detailed information concerning a selected resource such as billing information, cost information, guidelines for resource usage, as well as other resource details.

User selection of "view criteria" option 84 may direct to the user presentation of a content page detailing criteria associated with a selected resource as preferred by the selected resource provider. View criteria option 84, in an exemplary embodiment, may leverage access authorization engine 44, availability scheduled presentation engine 46 as well as one or more other software engines 20 and availability data storage 36, resource data storage 38 and/or other data. Information which may be communicated to a user upon selection of view criteria option 84 may include such resource provider preferred criteria as limiting requests or reservation of the resource to users holding an account with the present resource availability and reservation system, to users within a defined geographic location, to users willing to provide a quid pro quo, as well as various other criteria a resource provider may prefer.

Resource optional information listing 80 may also include "view linked resources" option 86. As described above, a resource provider may establish a pool of resources and require that a resource requester request reservation of two or more resources before the resource provider will permit the resource requestor to reserve any one resource. In the example mentioned above, a provider of a video conferencing hardware setup resource may link the reservation of such video conference hardware to concurrent reservation of adequate communication channel bandwidth to support the anticipated video conference and/or to concurrent reservation of meeting space. The manner in which one or more resources may be linked is substantially endless and any such linking may be implemented in accordance with teachings of the present invention.

A resource requester may also select "create notifications" option 88 from resource information option listing 80. In one aspect, a user may leverage create notifications option 88 to inform one or more additional parties of a reservation request having been made, of an upcoming meeting, of the anticipated unavailability of a resource requester, of preparations needing to be made in accordance with a reservation, as well as to inform one or more other parties as to various other informative aspects a resource requester deems relevant. Create notification option 88 may leverage notification engine 54 as well as one or more additional software engines 20 and/or data from data storage area 22 or other data accessible by computer or information handling system 12.

In one embodiment of the present invention, "verify availability" option 90 may be made available to a resource requestor within option list 80. As described above, a preferred embodiment of the present invention preferably conveys to a resource requestor current or up-to-date availability information for one or more resources maintained for reservation. As one embodiment of the present invention is preferably made available, substantially simultaneously, to numerous users, instances may arise in which the availability of a resource being viewed by a first resource requester may become stale or outdated in response to a request or reservation of the same resource by a second resource requestor and/or by removal of the resource from the reservation system by the resource provider. As such, verify availability option 90 may leverage resource availability verification engine 52, resource request and reservation management engine 50, availability data engine 42, as well as other software engine 20, and/or availability data storage 36, resource data storage 38, as well as additional data which may be included in data storage area 22 of computer or information handling system 12 in the performance of its preferred availability verification operations.

In the embodiment of content page 60 illustrated in FIG. 3, resource availability detail 62 informs the current resource requester as to the availability of resources 64, 66 and 68 with respect to an isolated day and during the hours of 8:00-5:00. In the event the resource requester is dissatisfied with the availability of the selected resources during the identified time period, here Monday, April 26, between the hours of 8:00-5:00, the resource requester may select "alternative timeframe" option 92 to create a new resource detail 62 for an alternate date and/or timeframe. For example, the instant resource requestor may utilize select alternative timeframe option 92 to create a subsequent resource detail 62 for Tuesday, April 27, between the hours of 8:00-5:00, for selected resources 64, 66 and 68. Alternate timeframe option 92 may also permit a user to "jump to" selected dates or times during which the resource requester will be available and capable of utilizing one or more of selected resources 64, 66 and 68.

In addition to resource detail 62, as well as the components thereof, a resource search content page 60 incorporating teachings of the present invention may also include a variety of other tools or options directed to increasing the utility of the associated resource availability and reservation system as well as the data forming a component thereof. In one embodiment, research search content page 60 preferably includes "search resources" option 94. Search resources option 94 may enable a resource requester to perform a search directed at the one or more resources sought for use by the resource requester.

For example, a resource requestor needing plumbing services may select search resources option 94 and search data storage area 22 to identify one or more plumbers available on a certain date and at a certain time, or based on other criteria. In an alternate example, if a resource requestor sought to hold a video conference, search resources option 94 may enable the resource requester to perform a search seeking to identify available video conferencing hardware, meeting space and communication channel bandwidth which the resource requestor may need to effect the video conference event. In a further example, a resource requester may leverage search resources option 94 to identify other members belonging to the same organizational department as the resource requester and that are available to attend an anticipated or desired meeting.

In a similar manner, an exemplary embodiment of resource search content page 60 may include "search providers" option 96. Search providers option 96 may enable a resource requester viewing content page 60 to locate resources available from a resource provider preferred by the resource requester. Search providers option 96 may be leveraged in a variety of alternative aspects.

A "customize view" option 98 may also be included in an exemplary embodiment of resource search content page 60. Customize view option 98 may enable a resource requester to rearrange presentation of data within content page 60 to suit resource requester viewing preferences. Additional information, options and/or functions may be incorporated into resource availability and reservation system resource search content page 60 without departing from the spirit and scope of the teachings of the present invention.

Figure 4:
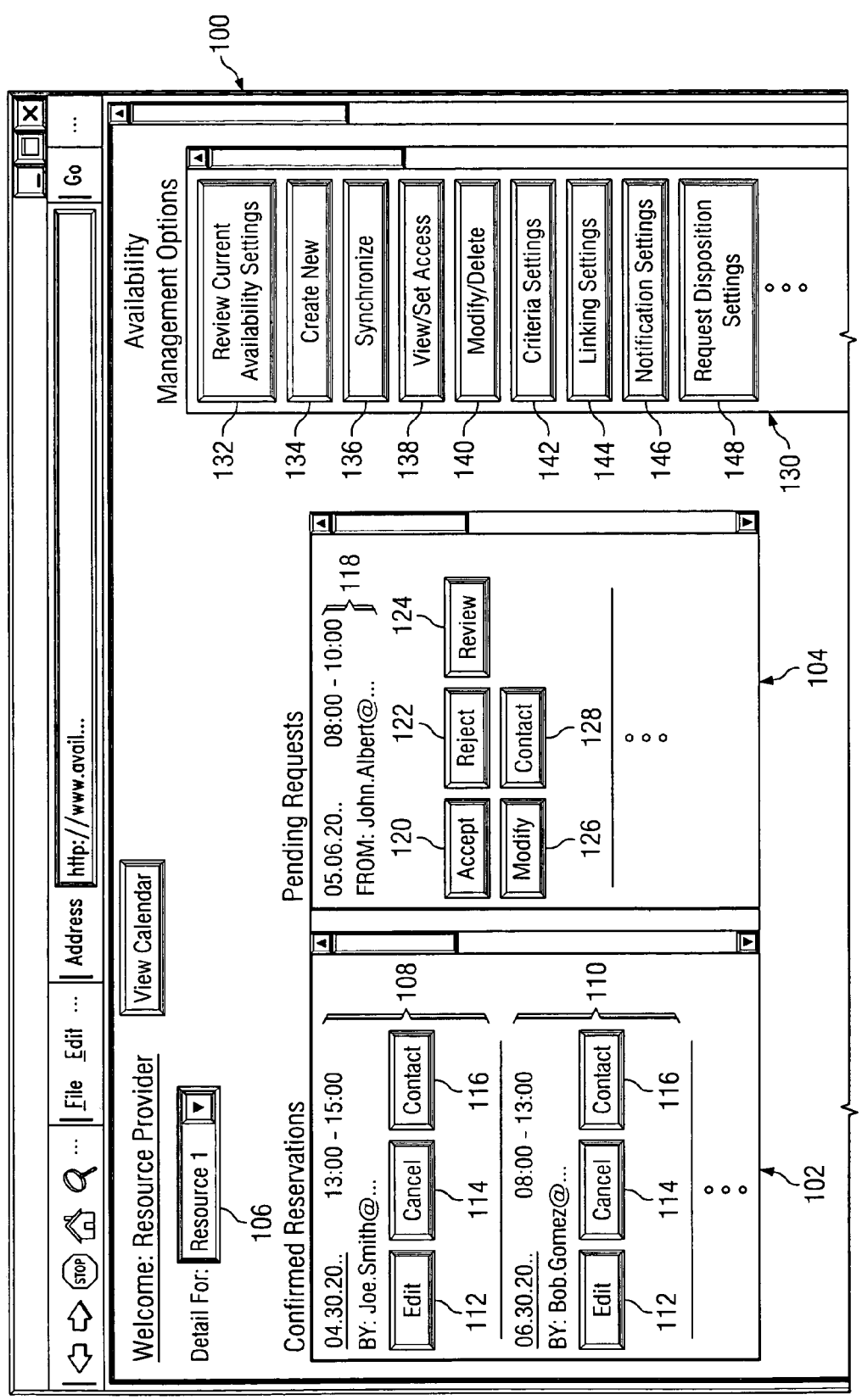
FIG. 4 is a schematic diagram depicting an exemplary embodiment of a resource availability and reservation system resource availability management content page according to teachings of the present invention.

Referring now to FIG. 4, a schematic diagram depicting an exemplary embodiment of a resource availability and reservation system availability management content page is shown according to teachings of the present invention. It should be noted that availability management content page 100 is exemplary and various modifications may be made thereto without departing from the teachings of the present invention.

An important aspect of teachings of the present invention is the capability of a resource provider to manage substantially all aspects of the one or more resources the resource provider maintains for reservation In this vein, one embodiment of a resource availability and reservation system availability management and content page is shown generally at 100 in FIG. 4. It should be noted that the layout depicted in FIG. 4 is presented primarily of purposes of discussion, and variations therefrom are contemplated within the scope of the teachings of the present invention.

An exemplary embodiment of a resource availability management content page 100 may include confirmed reservations display 102 and pending request display 104. In one embodiment, resource selection option 106 preferably enables a resource provider to select from the one or more resources maintained by the resource provider such that detailed information displayed in resource availability management content page 100 concerns the selected resource.

Confirmed reservations display 102 may be used in accordance with teachings of the present invention to inform a resource provider of one or more reservation confirmations for a selected resource. For example, in confirmed reservation display 102 of FIG. 4, an April 30 reservation from 1:00-3:00 is shown to be confirmed for Joe Smith and a June 30 reservation from 8:00-1:00 is shown to be confirmed for Bob Gomez. Additional options or information may be associated with reservations 108 and 110 such as options enabling the resource provider to edit 112 or cancel 114 a confirmed reservation, or to contact the resource requester with option 116. It should be understood that alternative presentations of confirmed reservations for one or more resources maintained by a resource provider may be implemented.

Pending reservation request display 104 may be provided to a resource provider to grant the resource provider rapid access to reservation requests received from one or more resource requesters for reservation of one or more resources maintained by the resource provider. For example, in pending request display 104 of FIG. 4, pending requests 118 reflects a request by John Albert for "Resource One" on May 6 during the hours of 8:00-10:00.

As the reservation requests presented in pending request display 104 remain outstanding, one or more options may be presented therein enabling the resource provider to process the requests. In an exemplary embodiment, the resource provider may be presented with "accept" pending reservation request option 120 with which the resource provider may accept or confirm the requested reservation as submitted by the resource requester. In addition, "reject" reservation request option 122 may be associated with pending request 118 and with which the resource provider may reject the reservation request. "Review" reservation request option 124 may also be provided to enable the resource provider to review additional details concerning a reservation request such as whether the resource requester meets selected criteria, has reserved one or more additional linked resources as well as other information.

Pending request display 104 may also include "modify" reservation request option 126 enabling a resource provider to alter one or more aspects of a pending reservation request before approval or for submission to the resource requester for consideration. "Contact" option 128 may also be included in pending request display 104 enabling the resource provider to correspond or otherwise communicate with the originator of the pending reservation request.

Exemplary resource availability and reservation system availability management content page 100 may also include a plurality of availability management options 130. In one embodiment, availability management options 130 may include "review current availability settings" option 132. Review current availability settings option 132 preferably enables a resource provider to review current settings of the availability resource identified in resource display 106, e.g., a calendar detailing current dates and timeframes for a selected resource.

In addition to review current availability settings option 132, availability management options 130 may also include "create new" option 134." Create new option 134 preferably enables a resource provider to provide an availability detail for an additional resource to be maintained for reservation through the associated resource availability and reservation system, to create an alternate availability for an existing resource maintained for reservation as well as perform other operations.

Availability management options listing 130 may also include "synchronize" option 36. As mentioned above, an exemplary embodiment of the present invention preferably includes the ability for a resource provider to synchronize availability settings for one or more resources from a resource provider maintained calendaring application such as Microsoft Outlook®, Yahoo Calendar®, as well as others, with the availability settings for one or more resources maintained for reservation by the resource provider via a resource availability and reservation system of the present invention.

Further, availability management options listing 130 may also include "view/set access" option 138. View/set access option 138 preferably enables a resource provider to set what level of authority is required for a resource requester to access one or more resources made available for reservation by the resource provider. View/set access option 138 may also enable a resource provider to define what information is viewed by a given resource requester or group of resource requesters when accessing, for example, resource search content page 60.

A "modify/delete" option 140 may also be included in availability management options listing 130. Modify/delete option 140 enables a resource provider to modify one or more aspects of a resource such as availability, criteria, linking, billing, etc. In addition, modify/delete option 140 may also enable a resource provider to delete a resource or availability setting as well as other information associated with a resource maintained for reservations by the resource provider.

Availability management options listing 130 may also include "criteria settings" options 142. Criteria settings option 142 may be provided to enable a resource provider to alter one or more criteria settings associated with a selected resource available for reservation. As mentioned above, numerous criteria may be associated with the one or more resources a resource provider maintains for reservation.

In still a further exemplary embodiment, availability management options listing 130 may also include "linking settings" options 144. Linking settings option 144 preferably enables a resource provider to create, add, modify or otherwise manipulate links desired between two or more resources. Linking settings option 144 may also enable a resource provider to define parameters or limitations upon which a resource requester may make reservation of two or more resources contingent, e.g., a resource requestor may have no use for videoconferencing hardware if the requestor cannot also reserve adequate bandwidth and a conference room.

Availability management options listing 130 may also include "notification settings" option 146. In an exemplary embodiment, notification settings option 146 may enable a resource provider to define how notification regarding one or more events associated with the resources maintained by the resource provider are handled. For example, a resource provider may define that a notification be sent to all members of the resource provider's group within an organization when a conference room available for reservation and provided by the resource provider is confirmed reserved. Alternate situations in which a resource provider may desire one or more notifications to be generated and/or communicated are contemplated within the spirit and scope of teachings of the present invention.

Still further, availability management options listing 130 may also include "request disposition settings" option 148. In an exemplary embodiment, request disposition settings option 148 preferably enables a resource provider to configure one or more guidelines under which reservations request received from one or more resource requesters are processed. For example, a resource provider may utilize request disposition settings option 148 to configure the automated disposition of reservation requests. Alternatively, a resource provider may utilize request disposition settings option 148 to require that the resource provider manually review, approve and/or reject all reservation requests for resources provided by the resource provider or some subset thereof.

Figure 5:
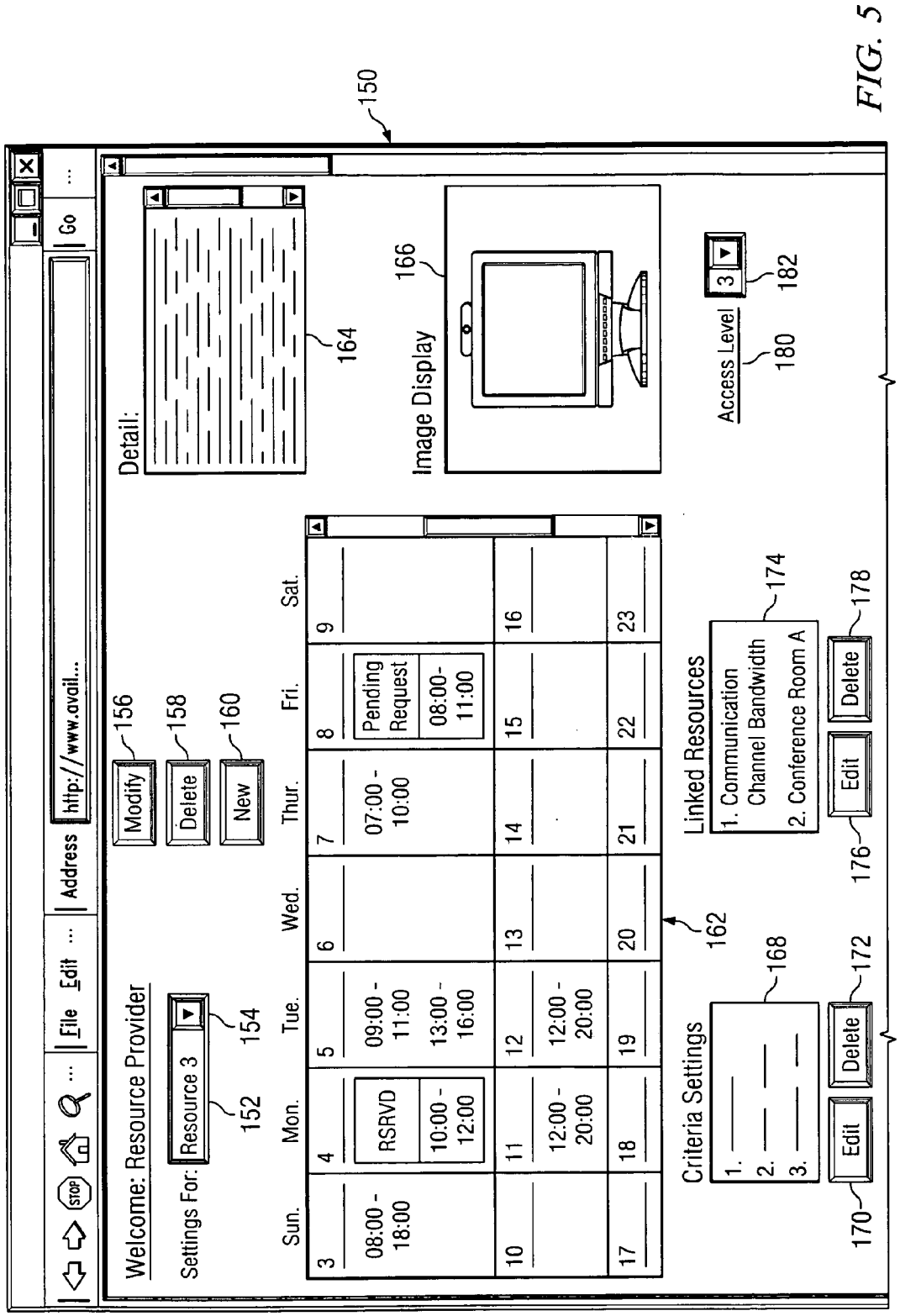
FIG. 5 is a schematic diagram depicting an exemplary embodiment of a resource availability and reservation system resource management content page according to teachings of the present invention.

Referring now to FIG. 5, a schematic diagram depicting an exemplary embodiment of a resource availability and reservation system resource management content page according to teachings of the present invention is shown. Preferably, resource management content page 150 enables a resource provider to maintain information related to the one or more resources made available for reservation by the resource provider. It should be noted that resource management content page 150 is exemplary and that various modifications may be made thereto without departing from the teachings of the present invention.

As illustrated in FIG. 5, resource management content page 150 may include resource identification display 152. Resource identification display 152 may have associated with it drop down option 154 enabling the registered resource provider to toggle or switch between resources made available for reservation by the resource provider, through the associated resource availability and reservation system.

"Modify", "delete" and "new" option 156, 158 and 160, respectively, may also be included in resource management content page 150. Modify option 156 preferably enables the resource provider to alter information included on resource management content page 150. Delete option 158 may also be provided on resource management content page 150 to enable a resource provider to delete information associated with the resource identified in resource identification display 152. New option 160 may enable a resource provider to create one or more additional availability schedules for the identified resource 152, to add a new resource to be maintained for reservation by the associated resource availability and reservation system, as well as to perform other operations.

A variety of information may be displayed in resource management content page 150 as illustrated in FIG. 5. For example, availability display 162 may be included to inform the resource provider as to one or more aspects of information associated with the availability of a selected resource. Availability display 162, here shown in a calendar view, may include information informing the resource provider of time remaining available to reserve the selected resource, periods during which the identified resource has been reserved and the reservation confirmed, identification of one or more pending reservation requests, as well as other information associated with the availability of a resource maintained for reservation by the resource provider.

In another aspect, resource management content page 150 may include detail or description section 164. Detail or description display 164 may include content a resource provider wishes to make available to resource requestors regarding the resources maintained for reservation by the resource provider. For example, resource detail may include one or more capabilities or functionalities of a resource made available for reservation by the resource provider. Detail or description display 164 may also include information the resource provider wishes to make available to a resource requester such as information concerning rates, terms, or other information associated with reservation of the resource provider's resources.

Image display area 166 may also be included in resource management content page 150. Image display 166 may include a picture or image to be made available to a resource requester in a search resource content page, such as resource search content page 60 of FIG. 3. Display area 166 may include images of hardware, an individual that is himself/herself the resource made available for reservation, advertisements for the resource provider, as well as other information.

In addition to the information provided above, resource management content page 150 may also include criteria settings display 168. As described above, a resource provider may set one or more criteria for a provided resource with which a resource requester must comply before qualifying for a resource reservation. Associated with criteria settings display 170 may be "Edit" option 170 and "Delete" option 172. Edit option 170 may enable a resource provider to alter the one or more criteria displayed in criteria settings display 168 and delete option 172 may enable a resource provider to delete criteria settings for the selected resource from criteria settings display 168.

Resource management content page 150 may also include linked resources display 174. Preferably included within linked resources display 174 are identifiers for one or more resources to which identified resource 152 are linked. "Edit" option 176 may be associated with linked resources display 174 to permit the resource provider to modify one or more aspects of a linked relationship. "Delete" option 178 may also be associated with linked resources display 174 to enable the resource provider to delete the linking requirements indicating in linked resources display 174.

Resource management content page 150 may also include access level indicator 180. As mentioned above, a resource provider may dictate what level of authorization or access a resource requestor must have before the resource requestor is permitted to view information concerning the resources maintained for reservation by the resource provider or make reservation requests. Access level selection mechanism display 182 preferably indicates current settings of access levels desired by the resource provider for the resource identified in resource identification display 152. It should be understood that varied content may be included in resource management content page 150 without departing from the spirit and scope of teachings of the present invention.

Figure 6:
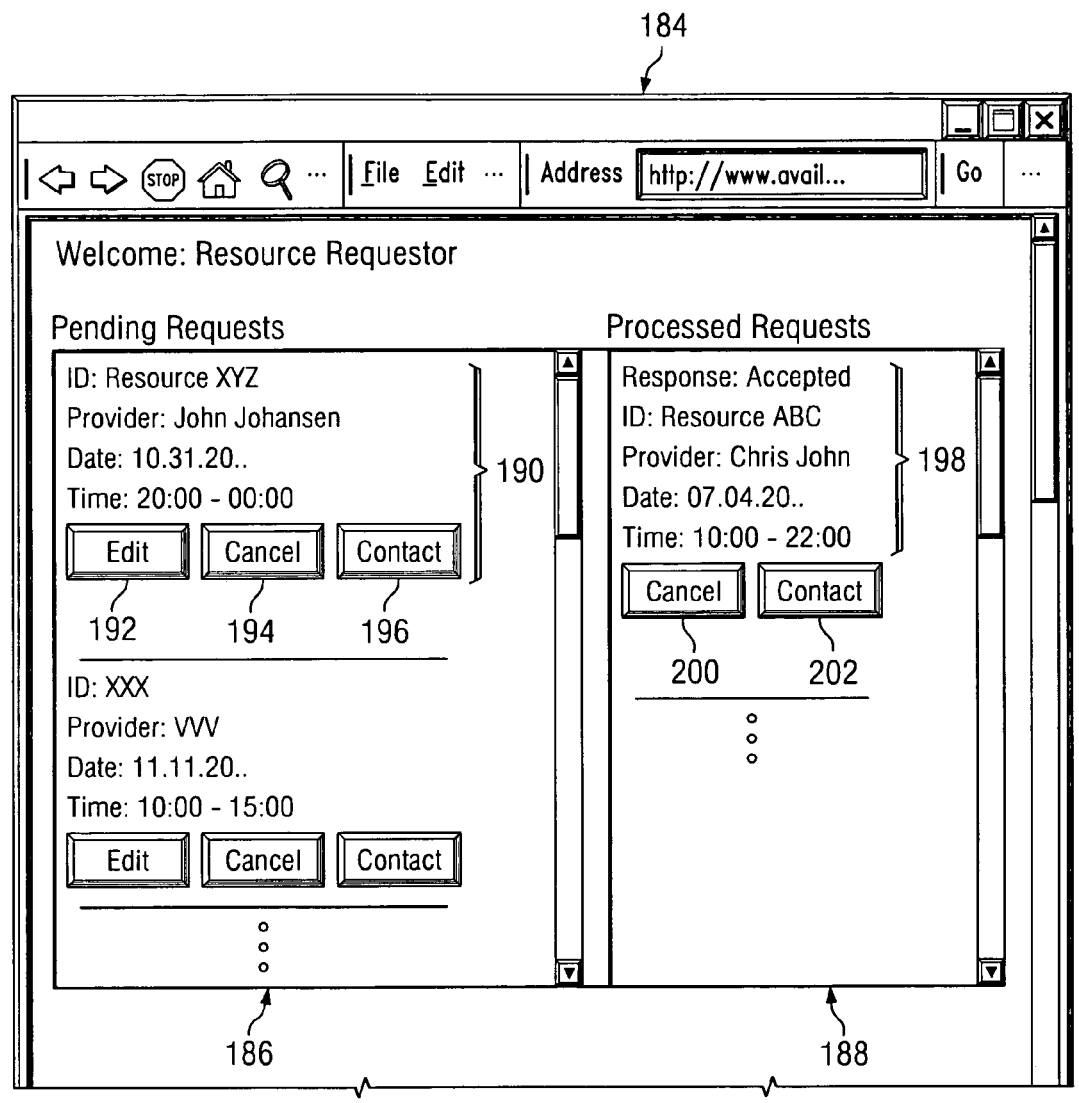
FIG. 6 is a schematic diagram depicting an exemplary embodiment of a resource availability and reservation system resource request and reservation management content page according to teachings of the present invention.

Referring now to FIG. 6, a schematic diagram depicting an exemplary embodiment of a resource availability and reservation system request and reservation management content page according to teachings of the present invention is shown. It should be noted that request and reservation management page 184 is exemplary and that various modifications may be made thereto without departing from teachings of the present invention.

In an exemplary embodiment, as mentioned above, a resource availability and reservation system incorporating teachings of the present invention preferably includes a request and reservation management content page such as request and reservation management content page 184. Depending upon implementation, request and reservation management content page 184 may include information pertinent to a resource requester. As illustrated in FIG. 6, information pertinent to a resource requester may include pending request display 186 and processed request display 188.

In one embodiment, pending request display 186 preferably lists outstanding reservation requests made by the identified resource requester and still outstanding with respect to approval, rejection or modification by the associated resource provider. Pending request display 186 may include a pending reservation request notification similar to pending reservation request notification 190, identifying the resource requested for reservation, the resource provider associated with the resource requested for reservation, the date for which the reservation has been requested and a time during which the reservation has been requested. "Edit" option 192 may be associated with pending request notification 190 and operable to permit the resource requestor to alter one or more aspects of the pending reservation request notification for consideration by the identified resource provider. "Cancel" option 194 may also be included to provide the resource requestor quick access to a reservation request cancellation operation. "Contact" option 196 may also be associated with pending reservation request notification 190 and operable to permit the resource requester to submit one or more communications to the identified resource provider. Additional information and/or operations may be associated with a pending request or reservation notification without departing from the spirit and scope of the present invention.

Processed or completed request display 188 preferably informs the identified resource requester as to the status of one or more processed requests for resource reservation. As illustrated in FIG. 6, processed reservation requests notification 198 preferably identifies the response to a resource requestor's request for resource reservation provided by the resource provider, identification information for the requested resource, identification information for the resource provider, as well as date and time information concerning the reservation request. "Cancel" option 200 may also be associated with processed resource reservation request notification 198 and is preferably operable to permit the resource requester to cancel accepted or other processed resource reservation requests. "Contact" option 202 may also be associated with processed resource reservation and request notification 198 and is preferably operable to permit the resource requester to generate and submit one or more communications for consideration by the provider of the identified resource. Various configurations of a processed resource reservation request display and processed research reservation request notification may be made without departing from the spirit and scope of teachings of the present invention.

Although the disclosed embodiments have been described in detail, it should be understood that various changes, substitutions and alterations can be made to the embodiments without departing from their spirit and scope.

What is claimed is:

1. Software for providing resource availability and reservation content, the software embodied in computer readable media and when executed operable to:

identify an access level associated with a requester seeking to access resource availability and reservation content maintained by a resource availability and reservation management system;

extract availability content from one or more resource availability and reservation management system data storage areas based on a requester resource selection and the requester access level;

present to the requester the extracted availability content along with one or more options enabling the requester to request reservation of an available resource;

verify requester compliance with one or more resource provider linking preferences, the linking preferences indicating a resource provider resource management preference requiring substantially concurrent requestor reservation of two or more resources; and verify requester compliance with one or more resource provider criteria defining requester characteristics preferred by the resource provider.

2. The software of claim 1, further operable to enable substantially simultaneous access to the resource availability and reservation content by a plurality of users and via one or more disparate networks.

3. The software of claim 1, further operable to submit a reservation request to a resource provider associated with a requester resource reservation selection.

4. The software of claim 3, further operable to process the reservation request submitted to the resource provider in accordance with one or more resource provider reservation request processing preferences.

5. The software of claim 1, further operable to provide a requester reservation request management content page including information as to a status of one or more requester generated resource reservation requests.

6. The software of claim 1, further operable to provide a resource provider reservation request management content page including information as to a status of one or more reservation requests originated in response to a requestor resource reservation request selection and one or more selectable reservation request disposition options.

7. The software of claim 1, further operable to:
verify a current availability of a resource indicated by a requester resource reservation selection; and
notify the requester as to a determination that the resource associated with the requester resource reservation selection is currently unavailable.

8. The software of claim 1, further operable to receive uploaded availability information concerning one or more resources to be maintained for reservation through a resource availability and reservation system.

9. The software of claim 1, further operable to perform periodic synchronization operations directed to synchronizing the resource availability content maintained in the one or more resource availability and reservation management system data storage areas with availability content in a resource provider maintained calendaring application.

10. The software of claim 9, further operable to generate personnel assignment notifications associated with fulfillment of a requester resource reservation system.

11. The software of claim 1, further operable to generate a notification indicative of a requestor resource reservation request.

12. The software of claim 1, further operable to provide one or more availability content search applications enabling a requestor to interrogate the resource availability and reservation system data storage areas.

13. A resource availability and reservation content management system, comprising:
at least one processor;
memory operably associated with the at least one processor;
at least one data storage device operably associated with the memory and the at least one processor;
at least one communication interface operably associated with the at least one processor and the memory, the at least one communication device operable to enable communications between the resource availability and reservation content management system and one or more user communication devices; and
at least one program of instructions stored in the memory and executable in the processor, the program of instructions operable to accept information defining a resource to be made available for reservation, maintain access to at least a portion of the information defining the resource to be made available for reservation through a content site accessible by a plurality of authorized users, and enable authorized user generation of reservation requests for one or more resources presented on the content site, wherein the program of instructions are operable to a permit resource provider to establish one or more reservation preferences linking two or more resources, to verify user compliance with resource provider resource linking preferences, and verify user compliance with one or more resource reservation request criteria.

14. The system of claim 13, further comprising the program of instructions operable to process reservation requests received by a resource provider in accordance with one or more resource provider reservation request processing preferences.

15. The system of claim 13, further comprising the program of instructions operable to receive accept information defining a resource to be made available from one or more user maintained calendaring programs.

16. The system of claim 15, further comprising the program of instructions to facilitate synchronization between the information defining a resource to be made available for reservation maintained by the resource availability and reservation content system and corresponding information in the one or more user maintained calendaring programs.

17. The system of claim 13, further comprising the program of instructions operable to generate one or more notifications informing a notification recipient as to one or more aspects of a reservation request.

18. The system of claim 13, further comprising the program of instructions operable to generate one or more resource provider resource management content pages.

19. The system of claim 13, further comprising the program of instructions operable to generate one or more resource requester reservation request management content pages.

20. The system of claim 13, further comprising the program of instructions operable to present a content site permitting substantially simultaneous access to information defining one or more resources available for reservation to a plurality of users from a variety of disparate networks.

* * * * *